US011823410B1

(12) United States Patent
Gilad et al.

(10) Patent No.: US 11,823,410 B1
(45) Date of Patent: Nov. 21, 2023

(54) VIDEO MATCH MOVING SYSTEM AND METHOD

(71) Applicants: Oran Gilad, Herzliya Pituach (IL); Samuel Chenillo, New York,, NY (US); Oren Steinfeld, Tel Aviv (IL)

(72) Inventors: Oran Gilad, Herzliya Pituach (IL); Samuel Chenillo, New York,, NY (US); Oren Steinfeld, Tel Aviv (IL)

( * ) Notice: Subject to any disclaimer, the term of this patent is extended or adjusted under 35 U.S.C. 154(b) by 0 days.

(21) Appl. No.: 18/315,692

(22) Filed: May 11, 2023

Related U.S. Application Data

(60) Provisional application No. 63/340,733, filed on May 11, 2022.

(51) Int. Cl.
*G06T 7/70* (2017.01)
*G06T 15/00* (2011.01)
*G06T 11/60* (2006.01)

(52) U.S. Cl.
CPC ............... *G06T 7/70* (2017.01); *G06T 11/60* (2013.01); *G06T 15/00* (2013.01); *G06T 2207/30244* (2013.01)

(58) Field of Classification Search
CPC ....... G06T 3/0068; G06T 3/0075; G06T 7/30; G06T 7/33; G06T 7/70; G06T 7/73; G06T 7/97; G06T 11/60; G06T 15/00; G06T 2207/30244; H04N 5/272; H04N 5/2723

See application file for complete search history.

(56) References Cited

U.S. PATENT DOCUMENTS

| 9,911,213 | B2 | 3/2018 | Gormish et al. |
| 11,557,019 | B1 | 1/2023 | Gonzales et al. |
| 2019/0057532 | A1* | 2/2019 | Marzban et al. ....... G06T 7/536 |
| 2019/0197709 | A1* | 6/2019 | Windmark et al. ..... G06T 7/248 |

* cited by examiner

*Primary Examiner* — Andrew W Johns
(74) *Attorney, Agent, or Firm* — RosserIP, LLC; Roy Rosser

(57) ABSTRACT

A system and method of video match moving using minimal calibration is disclosed. A camera obtains an initial set of calibration images and a location image. Homographies are then determined between all the images using direct linear transformation. Camera pose locations of the images are determined from the homography matrices. Match moving augmentation is accomplished by obtaining an homography between a live image and the location image, either directly, or by combining an homography to a calibration image with that calibration image's augmentation homography. A virtual augmentation is then placed in the live image. The system evaluates the quality of each live image homography. If of sufficiently high quality, that live image is added to the set of calibration images. When a live image is received, the search for an homography typically starts with the calibration image located closest in camera pose space to the preceding live image.

6 Claims, 5 Drawing Sheets

$$\begin{bmatrix} X' \\ Y' \\ 1 \end{bmatrix} = \begin{bmatrix} (0,0) & (0,1) & (0,2) \\ (1,0) & (1,1) & (1,2) \\ (2,0) & (2,1) & 1 \end{bmatrix} \begin{bmatrix} X \\ Y \\ 1 \end{bmatrix}$$

$$\begin{bmatrix} X' \\ Y' \\ 1 \end{bmatrix} = \begin{bmatrix} Sx & 0 & Tx \\ 0 & Sy & Ty \\ 0 & 0 & 1 \end{bmatrix} \begin{bmatrix} X \\ Y \\ 1 \end{bmatrix}$$

VIDEO MATCH MOVING SYSTEM AND METHOD

CROSS-REFERENCE TO RELATED APPLICATIONS

This is a non-provisional patent application of provision patent application U.S. 63/340,733 entitled "Video Match Moving Method" that was filed on 11 May 2022, the contents of which are hereby incorporated by reference into the current application in their entirety.

BACKGROUND OF THE INVENTION

(1) Field of the Invention

The invention relates to systems and methods of video match moving, and more particularly to systems and methods which enable the rapid calibration of images obtained from a camera being used to perform match moving augmentation on a stream of images of an event at an event venue.

(2) Description of Related Art

Video match moving is an important technique that allows television broadcasters to seamlessly blend graphic augmentations with live-action footage. Also known as motion tracking, video match moving may be the process of determining the movement of points or landmarks within the footage of an event, and using that information to realistically insert graphics or other augmentations into the footage, preferably in real, or near real time.

The process may involve tracking points within the video footage that may be known to be fixed in space, such as, but not limited to, the corners of a building or the edges of a table. The software may analyze the movement of these points to determine how a current image may be transformed to match other images in the video footage. Once that transformation, or homography, has been determined, the information may be used to place graphic augmentations into the scene, making the graphics appear as though they are part of the original footage.

In preparing to augment a stream of video images of an event, it is typically necessary to perform a calibration of the images obtained by a camera being used at an event venue. This typically involves the event camera being used to record a series of panoramic sweeps of the venue at a series of zoom levels. Once such a set of panoramic views is available, an incoming image may be matched to the panoramic views with sub-pixel accuracy. An accurate calculation may then be made of how to transform a virtual augmentation so as to realistically merge it with the incoming images, i.e., to make it appears to be a part of the event venue by inserting it in the incoming image at the correct location with the correct pose. However, acquiring such a set of detailed panoramic views is typically very time consuming, often requiring between 30 minutes and an hour to perform.

What is needed is a method of calibrating the images obtained from an event camera that requires a minimum of pre-event calibration.

The relevant prior art includes:

U.S. Pat. No. 9,911,213 to Michael Gormish that issued on Mar. 6, 2018 entitled "Panoramic Image Stitching Using Objects" that describes a system and method that determines a seam between pairs of adjacent images for panoramic image stitching. The method includes receiving a sequence of images, determining a pair of adjacent images in the sequence of images, matching one or more objects corresponding to a same object identifier in the pair of adjacent images, determining a seam in an overlap region between the pair of adjacent images and determining a portion of pixels from each image of the pair of adjacent images to represent in a stitched panoramic image based on the seam.

U.S. Pat. No. 11,557,019 to Antonio Gonzales et al. that issued on Jan. 17, 2023 entitled "Homography Generation for Image Registration In Inlier-poor Domains"" that describes a method for efficient image registration between two images in the presence of inlier-poor domains includes receiving a set of candidate correspondences between the two images. An approximate homography between the two images is generated based upon a first correspondence in the correspondences. The set of candidate correspondences is filtered to identify inlier correspondences based upon the approximate homography. A candidate homography is computed based upon the inlier correspondences. The candidate homography can be selected as a final homography between the two images based upon a support of the candidate homography against the set of candidate correspondences. An image registration is performed between the two images based upon the candidate homography being selected as the final homography.

Various implementations are known in the art, but fail to address all of the problems solved by the invention described herein. Various embodiments of this invention are illustrated in the accompanying drawings and will be described in more detail below.

BRIEF SUMMARY OF THE INVENTION

An inventive system and method of video match moving using minimal calibration is disclosed.

In a preferred embodiment, a fixed camera may be used to obtain an initial, discrete set of calibration images of an event venue. The camera may also be used to obtain a location image, i.e., an image in which an operator may indicate the position and pose in which to place a virtual augmentation or graphic. The number of initial calibration images may be small, preferably less than ten, and may, for instance, be limited to a set of images taken with the camera pointing forward, panned left and panned right, each at three zoom settings.

An homography may then be determined between the calibration images and the location image, and between each of the calibration images. The homography may, for instance, be obtained using one of the well-known methods such as, but not limited to, direct linear transformation (DLT).

A camera pose location of each of the images may also be obtained. The camera pose location may, for instance, be the position of the image within a coordinate system defined by camera parameters such as, but not limited to, the pan, tilt and zoom of the camera when the image was obtained. These parameters may, for instance, be determined from the elements of the relevant homography matrix.

The camera may now be sufficiently calibrated to begin performing match moving augmentation of a stream of images taken by the camera. To do this, the camera may, for instance, obtain a live image of an event occurring in the event venue. The system may use this live image to obtain an augmentation homography, i.e., an homography between the live image and the location image. This may be done directly, or it may be determined by first obtaining an homography to one of the calibration images and then combining that with the known homography between the calibration image and the location image.

Once the augmentation homography is obtained, the virtual graphic or augmentation may then be placed in the live image at the correct location and pose, thereby making it appear to a part of the event venue.

The system may also evaluate the quality of the homography of the live image. If the homography is of a sufficiently high quality, i.e., it exceeds a predetermined confidence level, the live image may then be added to the set of calibration images. In this way, the set of calibration images may be added to as the event progresses.

As the number of calibration images increases, the system may, when a new live image is received, elect to begin a search for an homography by first selecting the calibration image located closest to the camera pose location of the immediately preceding live image.

Therefore, the present invention succeeds in conferring the following, and others not mentioned, desirable and useful benefits and objectives.

It is an object of the present invention to provide a system and method that minimizes the time and effort required to calibrate images taken with an event camera at an event venue.

It is another object of the present invention to provide a system and method that enables a set of calibration images to be continually added to while performing match moving augmentation on a stream of images.

It is a further object of the present invention to provide a system and method that enables rapid, systematic search through candidate calibration images.

BRIEF DESCRIPTION OF THE SEVERAL VIEWS OF THE DRAWINGS

FIG. 3A shows a schematic representation of an homography transforming a location of a set of four points in a first image into a second image.

FIG. 3 C shows the impact of selected elements of an homography matrix.

DETAILED DESCRIPTION OF THE INVENTION

Figure 1:
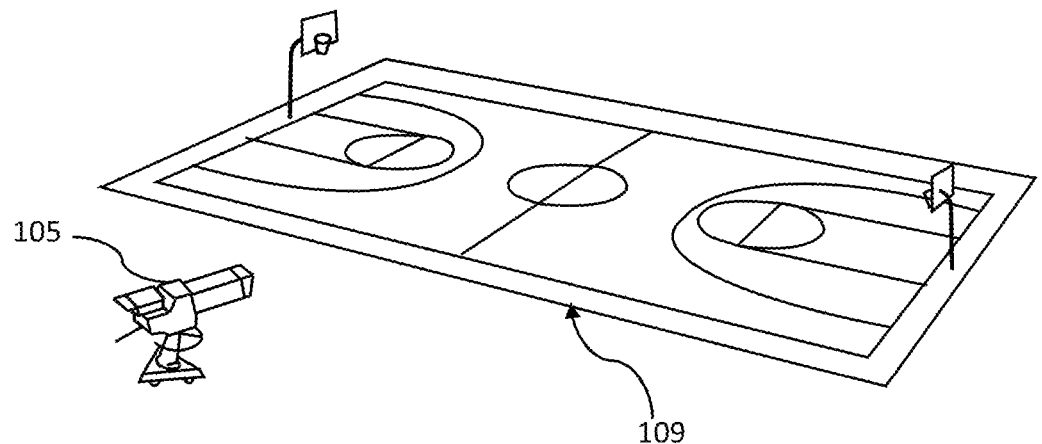
FIG. 1 shows a schematic representation of a camera being used to record or broadcast an event being held in an event venue.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation 100 of a camera 105 being used to record or broadcast an event being held in an event venue 109.

The camera 105 may, for instance, be a broadcast quality digital video camera. The camera may be being used to obtain images, or footage, of an event such as, but not limited to, a basketball game or an ice hockey match taking place in an event venue such as, but not limited to, a stadium or an ice rink.

Figure 2:
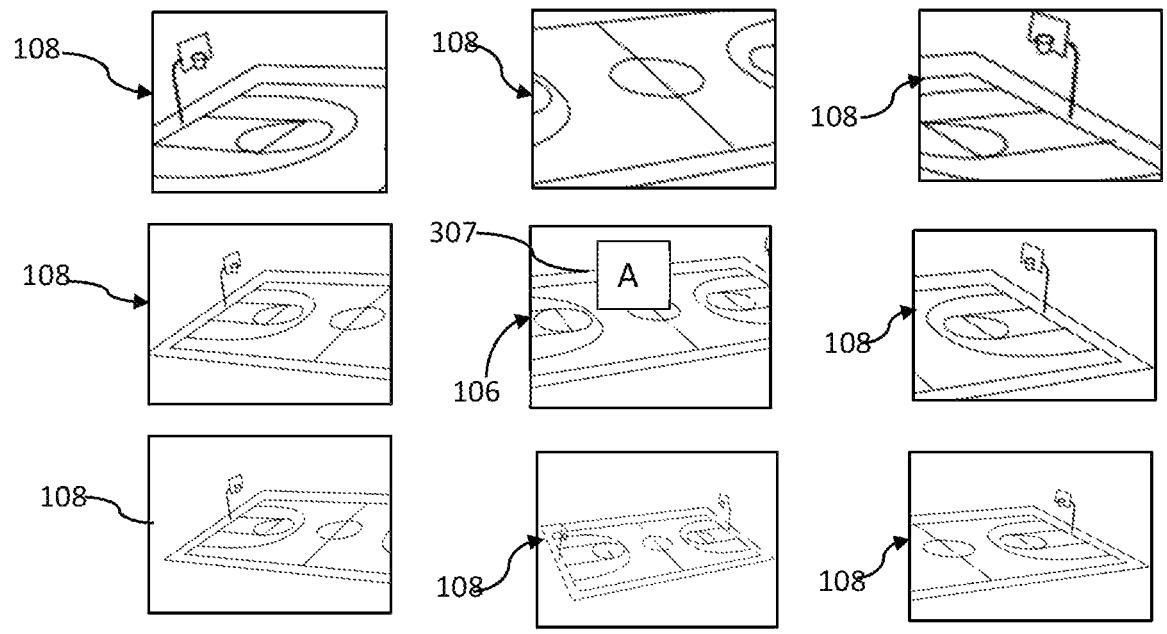
FIG. 2 shows a schematic representation of discrete set of initial calibration images and a location image.

FIG. 2 shows a schematic representation of discrete set 107 of initial calibration images 108 and a location image 106.

The images may be digital video images taken by a digital video camera that may be used to obtain video footage of an event occurring in an event venue. The number of initial calibration images may be small, preferably less than ten, and may, for instance, be images taken with the camera centered, panned left and panned right, each at three zoom locations, i.e., medium, zoomed in and zoomed out.

The location image 106 may be an image that may be used by an operator to indicate where an augmentation graphic 307 may be placed. The operator may, for instance, indicate the location and pose of the augmentation graphic, i.e., its size and orientation with respect to the event venue. The augmentation graphic 307 may be computer generated and may be a still image, a video, a 3D graphic, an animation, or some combination thereof.

FIG. 3A shows a schematic representation of an homography transforming a location of a set of four points in a first image into a second image.

Figure 3:
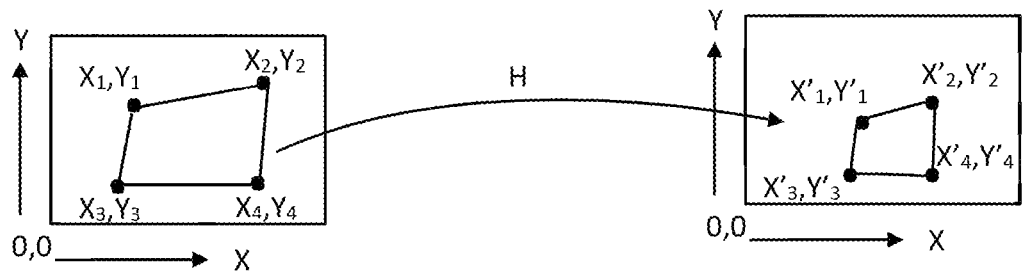
FIG. 3 B shows a general homography matrix.

As shown in FIG. 3, four points are located at a first set of positions in a first image on the left. The points are defined by their x and y coordinates. The second image, on the right, now shows the same four points but now located at different positions in the image. The points positions are now indicated by their x', y' coordinates.

The arrow labeled H is intended to indicate an homography transform that maps the x, y position of the points in the first image to the x', y' positions in the second image.

FIG. 3 B shows a general homography matrix.

The homography matrix shown in FIG. 3 B has eight degrees of freedom. Element (0,0) corresponds to scaling along the x axis; element (1,1) corresponds to scaling along the y axis; element (0,2) corresponds to translation along the x axis; element (1,2) corresponds to translation along the y axis; elements (1,0) and (0,1) corresponds to rotation of the image; and elements (2,0) and (2,1) correspond to keystone distortions of the image.

FIG. 3 C shows the impact of selected elements of an homography matrix.

The element marked Sx corresponds to scaling along the x-axis; the element marked Sy corresponds to scaling along the y-axis; the element marked Tx corresponds to translation along the x-axis; and the element marked Ty corresponds to translation along the y-axis. When confined to the six degrees of freedom of translation, rotation and scaling, each with respect to two axis, the homography transform is essentially equivalent to an affine transform.

Figure 4:
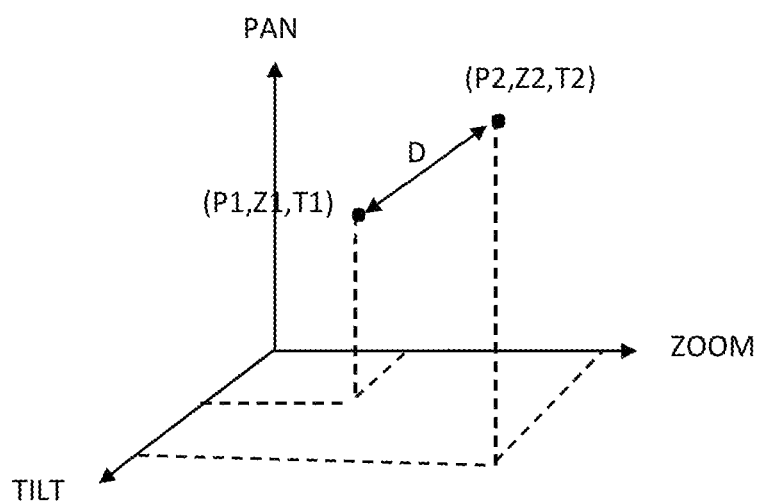
FIG. 4 shows an exemplary camera pose coordinate system.

FIG. 4 shows an exemplary camera pose coordinate system.

As shown in FIG. 4, a coordinate system may be constructed having multiple, orthogonal axes each representing a function or state of a camera. In this instance the three axes are shown as the pan, the tilt, and the zoom status of the camera when an image is recorded. One of ordinary skill in the art may appreciate that the number of axes in such a coordinate system may be extended to include camera parameters such as, but not limited to, rotation and translation.

A position of an image in camera pose space, i.e., the images camera pose location, may therefore be determined by from the homography parameters when the image is obtained. As shown in FIG. 3, there are two camera pose locations, one having coordinates P1, Z1, T1 and the second P2, Z2, T2. The distance between these two camera pose locations may be the Euclidian distance between them, i.e., the distance D as given by equation 1.

$$D = \text{Sqrt}((P2-P1)2 + (Z2-Z1)2 + (T2-T1)^2) \quad (1)$$

Figure 5:
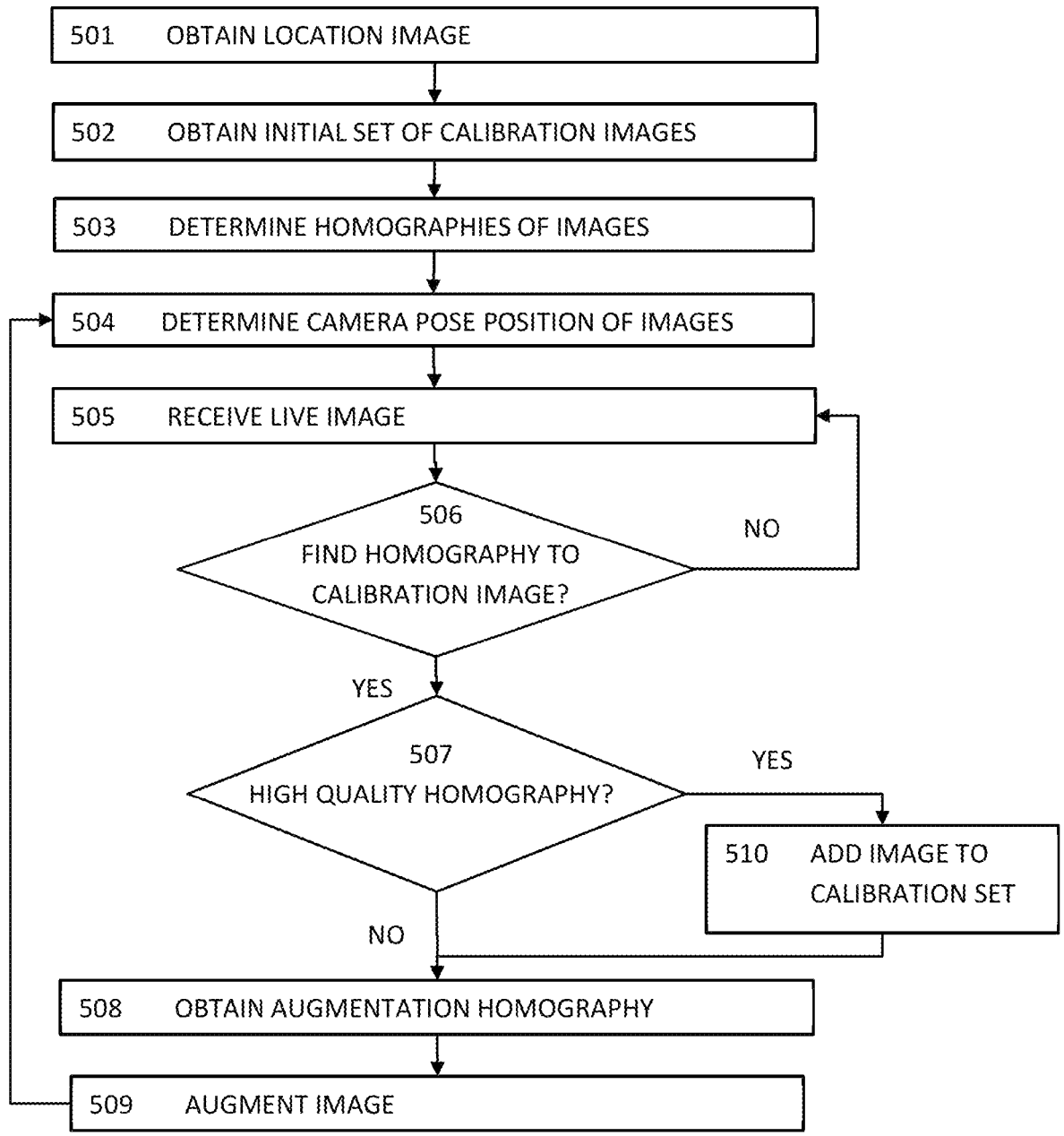
FIG. 5 is a flow diagram showing exemplary steps in performing the match moving augmentation of the present invention.

FIG. 5 is a flow diagram 500 showing exemplary steps in performing the match moving augmentation of the present invention.

In Step 501 "OBTAIN LOCATION IMAGE" the system may obtain an image that may be used to indicate the position at which a virtual augmentation may be placed. The location image may be a digital image obtained using the camera that later may be used to obtain images or footage of an event being staged in an event venue. The location image may, for instance, be used to also indicate the pose of the desired augmentation, including the size of the augmentation.

In Step 502 "OBTAIN INITIAL SET OF CALIBRATION IMAGES", the system may acquire a small number of discrete images representative of an event venue to be used as an initial set of calibration images. The images may be digital images obtained using the camera to be used to obtain images or footage of an event to be staged in the event venue. In a preferred embodiment, the number of calibration image may be limited to being less than ten and may, for instance, be images of the event area with the camera centered, panned left and panned right, each at multiple zoom setting such as a close zoom, a medium zoom and a long zoom. The initial calibration images may be spread out so that in their entirety they provide a reasonable coverage of the event venue as may be seen by the camera during the staging of an event. These initial calibration images may be obtained by an operator within a matter of minutes thereby facilitating rapid preparation of the camera for use in match moving augmentation in subsequent images obtained using the same camera.

In Step 503 "DETERMINE HOMOGRAPHIES OF IMAGES" the homography of each of the calibration images may be determined with respect to the location image and to each of the other calibration images.

An homography between two images is a transformation that maps the points in one image to the corresponding points in the other image.

A common method for obtaining an homography between two images is a technique called "direct linear transformation" (DLT). This method involves finding a set of corresponding points in both images, and then solving a set of linear equations to determine the homography matrix that maps one set of points to the other. The DLT method requires at least 4 matching points between the images. These points may, for instance, be obtained automatically using feature matching algorithms such as, but not limited to, the Harris Corner Detector. This may operate by computing the "corner response" function for each pixel in an image, i.e., by measuring how much the image would change if it were shifted in any direction. Corners are identified as pixels with a high corner response, i.e., pixels have large local gradients.

To obtain an homography between two images, the system may automatically identify a set of corresponding points om each of the images. A set of linear equations in terms of the homography matrix described above may then be set up between the points. This set of linear equations may then be solved using well-known mathematical techniques such as, but not limited to, least squares or singular value decomposition. Once the homography matrix is obtained, it may be applied to all pixels of a first image to warp it into the same coordinate system as a second image.

Multiple sets of points, typically on the order of a hundred sets, may be used to estimate the homography. Each of the homographies obtained with these sets may contain errors. A consensus homography for the two images may be obtained using well-known methods such as, but not limited to, Random Sample Consensus (RANSAC). This may for instance involve selecting a random subset of data points (called the "inliers") and fitting an homography to these points. Then, the remaining data points (called "outliers") may be tested against the fitted homography to determine how many of these points are consistent with the homography within a certain predetermined threshold or tolerance. If the number of these exceeds the threshold, the model is considered a good fit for the data. Otherwise, a new random sample may be selected and the process repeated until a satisfactory model is found.

In Step 504 "DETERMINE CAMERA POSE POSITION OF IMAGES" the camera pose location of the images may be obtained. This location may, for instance, be obtained from the homography matrices of the images.

If, for instance, the location image is selected to be at the point (0,0,0) of a three axes camera pose coordinate system based on, for instance, zoom, pan, and tilt, then the camera pose location of any other image may be read off the augmentation homography, i.e., the homography of that image with respect to the location image. The pan value, i.e., the translation along the y-axis may be the (1, 2) element of the matrix, the zoom value may be either or both of the (0,0) and the (1,1) element, and the tilt value may be the (0,2) element.

Once the calibration and location images have been obtained and processed, the system may be ready to begin match moving augmentation of a stream of images. To do this the system may proceed to Step 505 "RECEIVE LIVE IMAGE" in which a live image of an event occurring in the event venue may be obtained using the calibrated digital video camera. Once the live image is obtained, an attempt may be made to obtain an homography between it and one of the calibration images. The calibration images on which the attempt is made may initially be made in random order as there are a limited number of them.

If no homography is found, it may be because the image stream of the event is being obtained from a different camera, and the system may loop back to Step 505 and wait for another live image.

If an homography of the live image to a calibration image is obtained, it may be tested for quality to see if the quality exceeds a predetermined confidence level. The homography may, for instance, have been obtained as a consensus among a multiplicity of corresponding sets of data point numbering in the hundreds. The predefined confidence level may, for instance, be that a sufficient number of homographies of the individual sets of data agree to within a predetermined threshold. A sufficient number may be that more than 50% of the individual homographies are within a threshold of 2% of the consensus homography. In a more demanding broadcast, the number in agreement to within a 2% threshold may be 90%.

When a live image homography has been deemed to exceed the predetermined confident level, the system may proceed to Step 510 "ADD IMAGE TO CALIBRATION SET". In this step the live image deemed to have an homography of calibration quality may be added to the set of calibration images.

In either instance, the system may now proceed to Step 508 "OBTAIN AUGMENTATION HOMOGRAPHY" in which the homography between the live image and the location image may be obtained. As homographies are transitive, this may be done by combining the homographies. In particular the homography of the live image to the calibration image may be combined with the known augmentation homography of the calibration image to the location image. The result may be the augmentation homography of the live image.

The system may then proceed to Step 509 "AUGMENT IMAGE" in which the augmentation homography of the live image may be used to transform or warp the virtual augmentation or graphic and merge it with the live image. The merged virtual augmentation may now appears to be a part of, or placed in, the event venue as it appear as the appropriate location with the appropriate pose.

Having augmented the live image, the system may proceed to step 504 to determine the camera pose position of the live image, and then on to Step 505 to receive the next live image.

Figure 6:
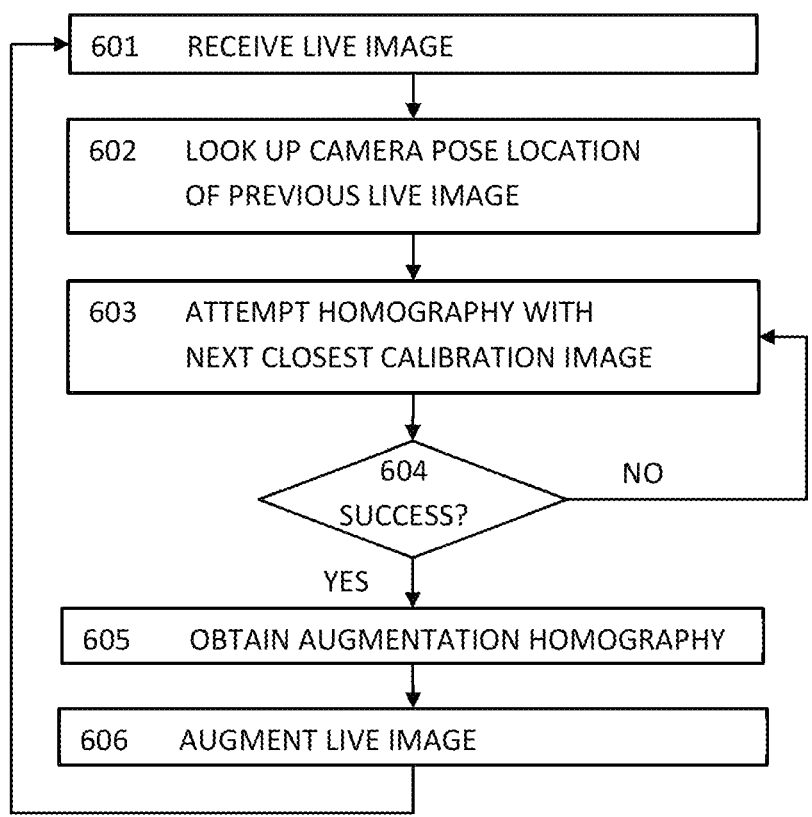
FIG. 6 is a flow diagram showing further exemplary steps in performing the match moving augmentation of the present invention.

FIG. 6 is a flow diagram 600 showing further exemplary steps in performing the match moving augmentation of the present invention.

In Step 601 "RECEIVE LIVE IMAGE" the system may receive a new live image from a camera that has been calibrated and is being used to perform match moving augmentation for an event occurring in an event location.

The system may then implement Step 602 "LOOK UP CAMERA POSE LOCATION OF PREVIOUS LIVE IMAGE" in which the camera pose location of the previous live image may be obtained.

The system may then proceed to Step 603 "ATTEMPT HOMOGRAPHY WITH NEXT CLOSEST CALIBRATION IMAGE" and may select the calibration image that may be closest in camera pose space to camera pose location of the immediately preceding live image.

If in Step 604 "SUCCESS?", no acceptable homography is obtained between the current live image and that calibration image, the system may loop back to Step 603. In this step, it may then locate the calibration image that is the next closest in camera pose space to the immediately preceding live image. An attempt may then be made to find a satisfactory homography between this calibration image and the current live image. This process may be repeated until a satisfactory homography is obtained. The system may then move on to Step 605.

In Step 605 "OBTAIN AUGMENTATION HOMOGRAPHY" the system may take advantage of the transitive properties of homographies, and obtain an augmentation homography by combining the live image to calibration image homography with the known calibration image to location image homography.

In Step 606 "AUGMENT LIVE IMAGE" in which the augmentation homography of the live image to the location image may be used to transform or warp the required virtual augmentation or graphic and merge it with the live image so that it appears to be a part of, or placed in, the event venue in the appropriate location with the appropriate pose.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of video match moving, comprising:
obtaining, using a digital video camera, a location image, and a discrete set of calibration images, said images being digital images representative of an event venue;
determining an homography of each of said calibration images with respect to said location image and with respect to each other of said calibration images;
determining a camera pose location of said location image, and of each of said calibration images;
receiving a live image, obtained using said camera, of an event occurring within said event venue;
obtaining an augmentation homography of said live image with respect to said location image; and,
augmenting said live image with an augmentation graphic using said augmentation homography.

2. The method of claim 1 wherein there are fewer than ten images in said set of calibration images.

3. The method of claim 1, wherein, said obtaining said augmentation homography comprises obtaining a first homography of said live image with respect to one of said calibration images; and, combining said first homography with the known homography of said one of said calibration images to said location image, thereby obtaining said augmentation homography of said live image to said location image.

4. The method of claim 1, further comprising, obtaining a first homography of said live image to one of said calibration images; evaluating said first homography; and, when said first homography exceeds a predefined confidence level, designating said live image as a further one of said set of calibration images.

5. The method of claim 1, wherein, said obtaining said augmentation homography comprises attempting to obtain an homography by first examining a relation between said live-image and a calibration image having a camera pose location closest to a camera pose location of an immediately preceding live image.

6. The method of claim 1, wherein, said camera pose location of one of said images comprises a location within a camera-pose space comprised of orthogonal coordinates representing camera pan, camera tilt and camera zoom.

\* \* \* \* \*